US012612065B2

(12) United States Patent
Song

(10) Patent No.: US 12,612,065 B2
(45) Date of Patent: Apr. 28, 2026

(54) VEHICLE CONTROL SYSTEM AND METHOD USING RISK ANALYSIS OF A ROAD SECTION AND BEACON DATA

(71) Applicant: HYUNDAI MOBIS Co., Ltd., Seoul (KR)

(72) Inventor: Kyung Jung Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 318 days.

(21) Appl. No.: 17/964,940

(22) Filed: Oct. 13, 2022

(65) Prior Publication Data

US 2023/0150534 A1     May 18, 2023

(30) Foreign Application Priority Data

Nov. 16, 2021     (KR) ........................ 10-2021-0157998
Nov. 16, 2021     (KR) ........................ 10-2021-0158005

(51) Int. Cl.
*B60W 60/00*          (2020.01)
*B60W 50/14*          (2020.01)

(52) U.S. Cl.
CPC .......... *B60W 60/001* (2020.02); *B60W 50/14* (2013.01); *B60W 2552/05* (2020.02); *B60W*

2556/40 (2020.02); *B60W 2556/45* (2020.02); *B60W 2720/10* (2013.01)

(58) Field of Classification Search
None
See application file for complete search history.

(56) References Cited

U.S. PATENT DOCUMENTS

| | | | | |
|---|---|---|---|---|
| 10,962,372 | B1 * | 3/2021 | Rao ...................... | G06N 3/0464 |
| 2019/0126915 | A1 * | 5/2019 | Kim ...................... | B60W 30/09 |
| 2020/0356107 | A1 * | 11/2020 | Wells ........................ | G01S 5/16 |
| 2022/0397402 | A1 * | 12/2022 | Bolless ............ | G08G 1/096725 |

* cited by examiner

*Primary Examiner* — James J Lee
*Assistant Examiner* — Jonathan E Reinert
(74) *Attorney, Agent, or Firm* — MORGAN, LEWIS & BOCKIUS LLP

(57)          ABSTRACT

Disclosed are a vehicle control system and a driving method of a vehicle using the vehicle control system. The vehicle control system includes a processor that processes data related to driving of a vehicle, and a vehicle controller that controls the driving of the vehicle, wherein the processor analyzes characteristics of a risk section of a road corresponding to a signal received from a beacon installed in the risk section of the road, based on a sparse map including an installation position of the beacon, and characteristic information of the risk section.

9 Claims, 14 Drawing Sheets

212

211

RECEIVE PLURALITY OF IMAGES
FROM PLURALITY OF VEHICLES          ~310

IDENTIFY AT LEAST ONE
FEATURE ON ROAD SURFACE          ~320

IDENTIFY PLURALITY OF
LANDMARKS RELATED TO ROAD          ~330

DETERMINE AT LEAST ONE
MOVEMENT DEPICTION OF VEHICLE                    ~410

RECEIVE AT LEAST ONE IMAGE SHOWING
SURROUNDING SITUATION OF VEHICLE                 ~420

ANALYZE IMAGE TO DETERMINE ROAD FEATURE          ~430

COLLECT SECTION INFORMATION ABOUT EACH
OF PLURALITY OF SECTIONS INCLUDED IN ROAD        ~440

SPECIFY RISK SECTION AND CLASSIFY RISK SECTION BASED ON CHARACTERISTICS THEREOF ~510

INCLUDE INSTALLATION POSITION OF BEACON INSTALLED IN RISK SECTION INTO SPARSE MAP ~520

RECEIVE SIGNAL TRANSMITTED FROM BEACON IN VEHICLE ~530

CONTROL DRIVING OF VEHICLE BASED ON CHARACTERISTICS OF RISK SECTION INCLUDED IN SIGNAL ~540

VEHICLE CONTROL SYSTEM AND METHOD USING RISK ANALYSIS OF A ROAD SECTION AND BEACON DATA

CROSS-REFERENCE TO RELATED APPLICATION

This application claims the benefit of priority to Korean Patent Application No. 10-2021-0157998, filed in the Korean Intellectual Property Office on Nov. 16, 2021 and Korean Patent Application No. 10-2021-0158005, filed in the Korean Intellectual Property Office on Nov. 16, 2021, the entire contents of which are incorporated herein by reference.

TECHNICAL FIELD

The present disclosure relates to a vehicle control system and a vehicle driving method using the vehicle control system, and more particularly, to an autonomous driving technology that improves accuracy of a target travel route.

BACKGROUND

Autonomous driving technology in which a travel route of a vehicle is set and the vehicle travels according to the set travel route while the driver does not drive the vehicle directly is emerging. Autonomous driving technology may be implemented in a scheme of acquiring route information on the travel route, setting the travel route based on the obtained route information, and driving the vehicle according to the set route.

SUMMARY

According to the existing autonomous driving technology, it may not be easy to set an accurate travel route for various situations.

The present disclosure has been made to solve the above-mentioned problems occurring in the prior art while advantages achieved by the prior art are maintained intact.

An aspect of the present disclosure provides a technique for setting an accurate travel route for various situations.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control system includes a processor that processes data related to driving of a vehicle, and a vehicle controller that controls the driving of the vehicle, wherein the processor analyzes characteristics of a risk section of a road corresponding to a signal received from a beacon installed in the risk section of the road, based on a sparse map including an installation position of the beacon, and characteristic information of the risk section.

According to an aspect of the present disclosure, a vehicle control system includes a processor that processes data related to driving of a vehicle, and a vehicle controller that controls the driving of the vehicle, wherein the processor identifies at least one beacon installed by a specified spacing in a target section, based on an installation position thereof, includes the at least one beacon identified based on the installation position into a sparse map, determines accuracy of a trajectory along which the vehicle is driving, based on a signal output from the at least one beacon, and determine whether to enter or exit the target section, based on the signal output from the at least one beacon.

According to an aspect of the present disclosure, a method for driving a vehicle using a vehicle control system includes analyzing characteristics of a risk section of a road corresponding to a signal received from a beacon installed in the risk section of the road, based on a sparse map including an installation position of the beacon, and characteristic information of the risk section.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
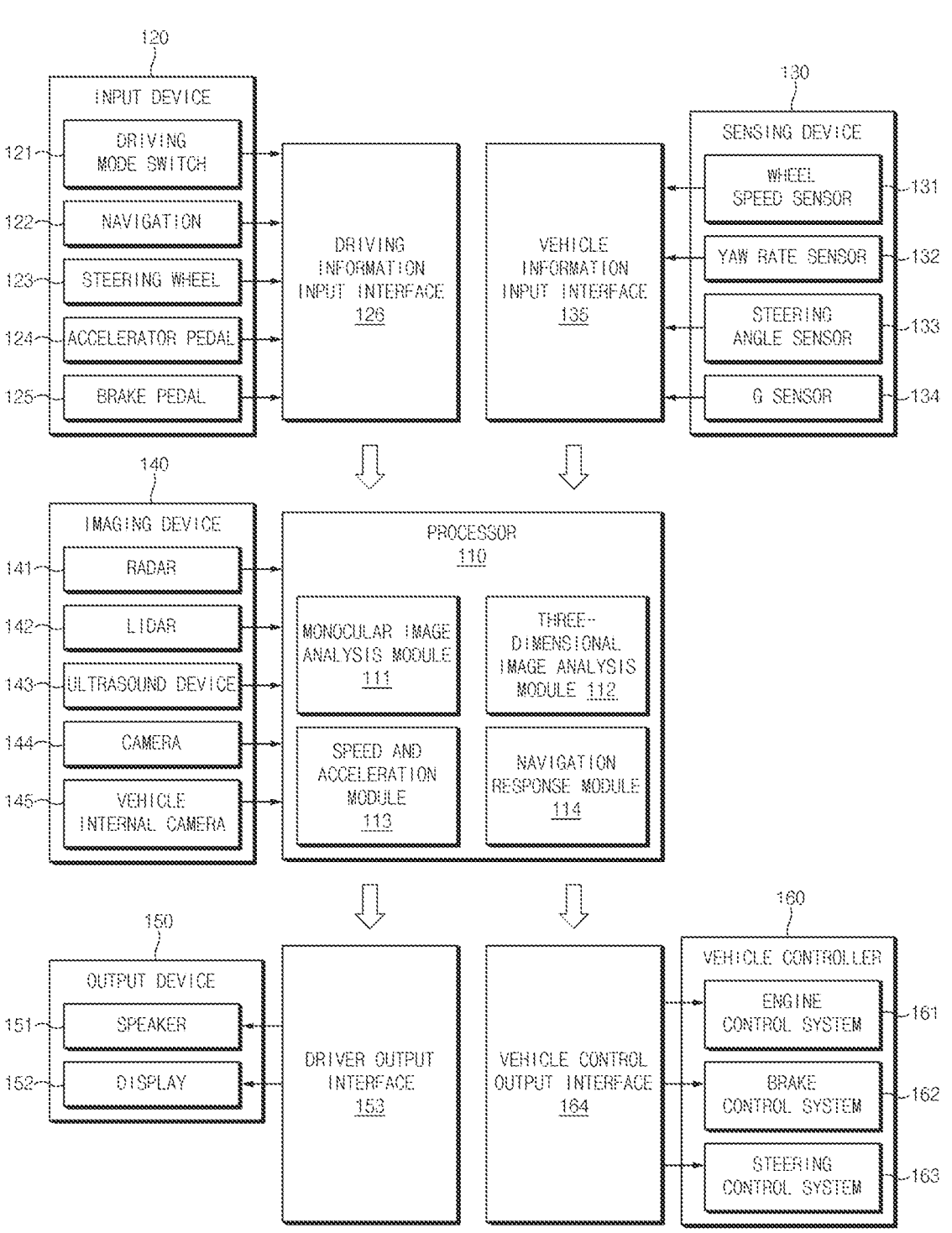
FIG. 1 is a block diagram showing a vehicle control system according to one embodiment of the present disclosure.

FIG. 1 is a block diagram showing a vehicle control system according to one embodiment of the present disclosure.

The vehicle control system according to one embodiment may include a processor 110, an input device 120, a sensing device 130, an imaging device 140, an output device 150, and a vehicle controller 160.

The processor 110 and the vehicle controller 160 of the vehicle control system according to an exemplary embodiment of the present disclosure may be a hardware device implemented by various electronic circuits (e.g., computer, microprocessor, CPU, ASIC, circuitry, logic circuits, etc.). The processor 110 and the vehicle controller 160 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory, the processor 110 and the vehicle controller 160 may be implemented as separate semiconductor circuits. Alternatively, the memory, the processor 110 and the vehicle controller 160 may be implemented as a single integrated semiconductor circuit. The processor 110 may embody one or more processor(s). The vehicle controller 160 may embody one or more processor(s).

The processor 110 may realize autonomous driving by processing data related to driving of a vehicle. The processor 110 may include a monocular image analysis module 111, a three-dimensional image analysis module 112, a speed and acceleration module 113, and a navigation response module 114.

The monocular image analysis module 111 may analyze a monocular image of an image set acquired by the imaging device 140. The monocular image analysis module 111 may merge data included in the image set with other types of data acquired by the imaging device 140 to perform monocular image analysis. The monocular image analysis module 111 may detect, within the image set, features such as a lane marking, a vehicle, a pedestrian, a road sign, a highway interchange, a traffic light, a risk object, and other feature related to the vehicle's surroundings. The processor 110 of the vehicle control system may cause at least one navigation response such as rotation, lane change, or acceleration change of the vehicle, based on the analysis result of the monocular image analysis module 111.

The three-dimensional image analysis module 112 may combine data acquired from the imaging device 140 and data acquired from the sensing device 130 with each other and perform analysis thereon. The three-dimensional image analysis module 112 may perform three-dimensional image analysis. The three-dimensional image analysis module 112 may implement a method related to a neural network learning system, a deep neural network learning system, or a non-learning system that utilizes a computer vision algorithm to detect and/or label an object in a context of capturing and processing sensed information. The three-dimensional image analysis module 112 may employ a combination of a learning system and a non-learning system.

The speed and acceleration module 113 may control change in a speed and/or an acceleration of the vehicle. The speed and acceleration module 113 may calculate a target speed of the vehicle based on data obtained from the monocular image analysis module 111 and/or the three-dimensional image analysis module 112. The data obtained from the monocular image analysis module 111 and/or the three-dimensional image analysis module 112 may include a target position, a speed, an acceleration, the vehicle's position and/or speed with respect to a surrounding vehicle, a pedestrian or an object on a road, and position information of the vehicle for lane indication of the road. The speed and acceleration module 113 may transmit a speed control signal to the vehicle controller 160 based on the calculated target speed.

The navigation response module 114 may determine a necessary navigation response based on the data obtained from the monocular image analysis module 111, the three-dimensional image analysis module 112, and the input device 120. The data obtained from the monocular image analysis module 111, the three-dimensional image analysis module 112, and the input device 120 may include a position and a speed of the vehicle with respect to a surrounding vehicle, a pedestrian, and an object on a road, and target position information of the vehicle. The navigation response may be determined based on map data, preset vehicle position, a relative speed or a relative acceleration between the vehicle and at least one object. The navigation response module 114 may transmit a navigation control signal to the vehicle controller 160 based on a navigation response determined as being necessary. For example, the navigation response module 114 may generate the necessary navigation response by rotating the vehicle's steering handle to induce rotation by a preset angle. The navigation response determined to be necessary by the navigation response module 114 may be used as data input to the speed and acceleration module 113 to calculate a speed change of the vehicle.

The input device 120 may receive a user input for controlling a driving function. The input device 120 may include a driving mode switch 121, a navigation 122, a steering wheel 123, an accelerator pedal 124, and a brake pedal 125. The input device 120 may transmit the user input to the processor 110 through a driving information input interface 126.

The sensing device 130 may acquire data related to driving of the vehicle from the vehicle and an external environment. The sensing device 130 may include a wheel speed sensor 131, a yaw rate sensor 132, a steering angle sensor 144, and a G sensor 134. The sensing device 130 may transmit the acquired data to the processor 110 through a vehicle information input interface 135.

The imaging device 140 may detect and image an external environment. The imaging device 140 may include a radar 141, a lidar 142, an ultrasound device 143, a camera 144, and a vehicle internal camera 145. The imaging device 140 may transmit the sensed and imaged external environment to the processor 110.

The output device 150 may provide information related to driving of the vehicle to an occupant including the driver. The output device 150 may include a speaker 151 and a display 152. The output device 150 may provide information related to driving of the vehicle output from the processor 110 through a driver output interface 153 to the occupant.

The vehicle controller 160 may control driving of the vehicle. The vehicle controller 160 may include an engine control system 161, a brake control system 162, and a steering control system 163. The vehicle controller 160 may receive driving control information output from the processor 110 through a vehicle control output interface 164 to control driving of the vehicle.

Figure 2:
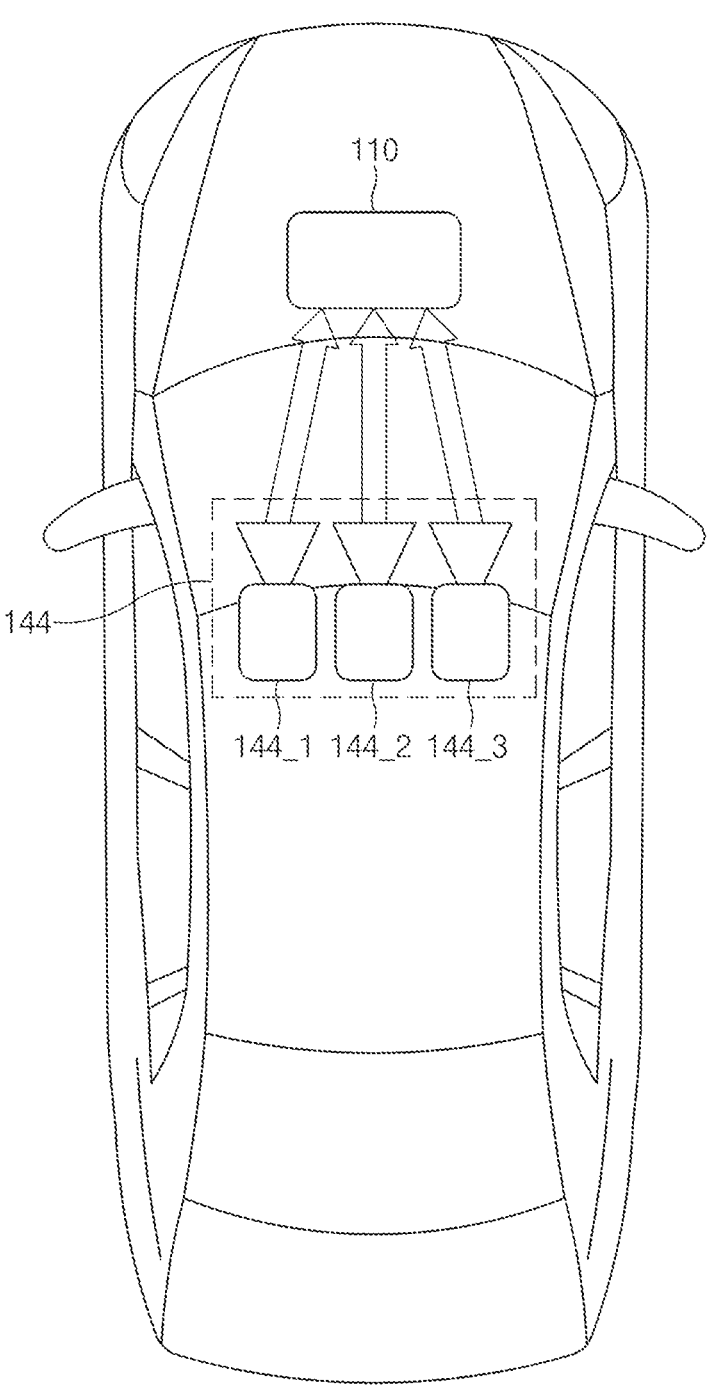
FIG. 2 is a view showing a position at which a camera of a vehicle control system according to one embodiment of the present disclosure is disposed on a vehicle.

FIG. 2 is a view showing the position in which a camera of the vehicle control system according to one embodiment of the present disclosure is disposed on the vehicle.

A camera 144 may include a first camera device 144_1, a second camera device 144_2, and a third camera device 144_3. The first camera device 144_1, the second camera device 144_2, and the third camera device 144_3 may be arranged side by side in a width direction of the vehicle. The first camera device 144_1, the second camera device 144_2, and the third camera device 144_3 may be disposed around a rear view mirror of the vehicle and/or adjacent to a driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) thereof based on differences between positions of the first camera device 144_1, the second camera device 144_2, and the third camera device 144_3. The camera 144 may transmit image data of the external environment as captured to the processor 110.

Figure 3:
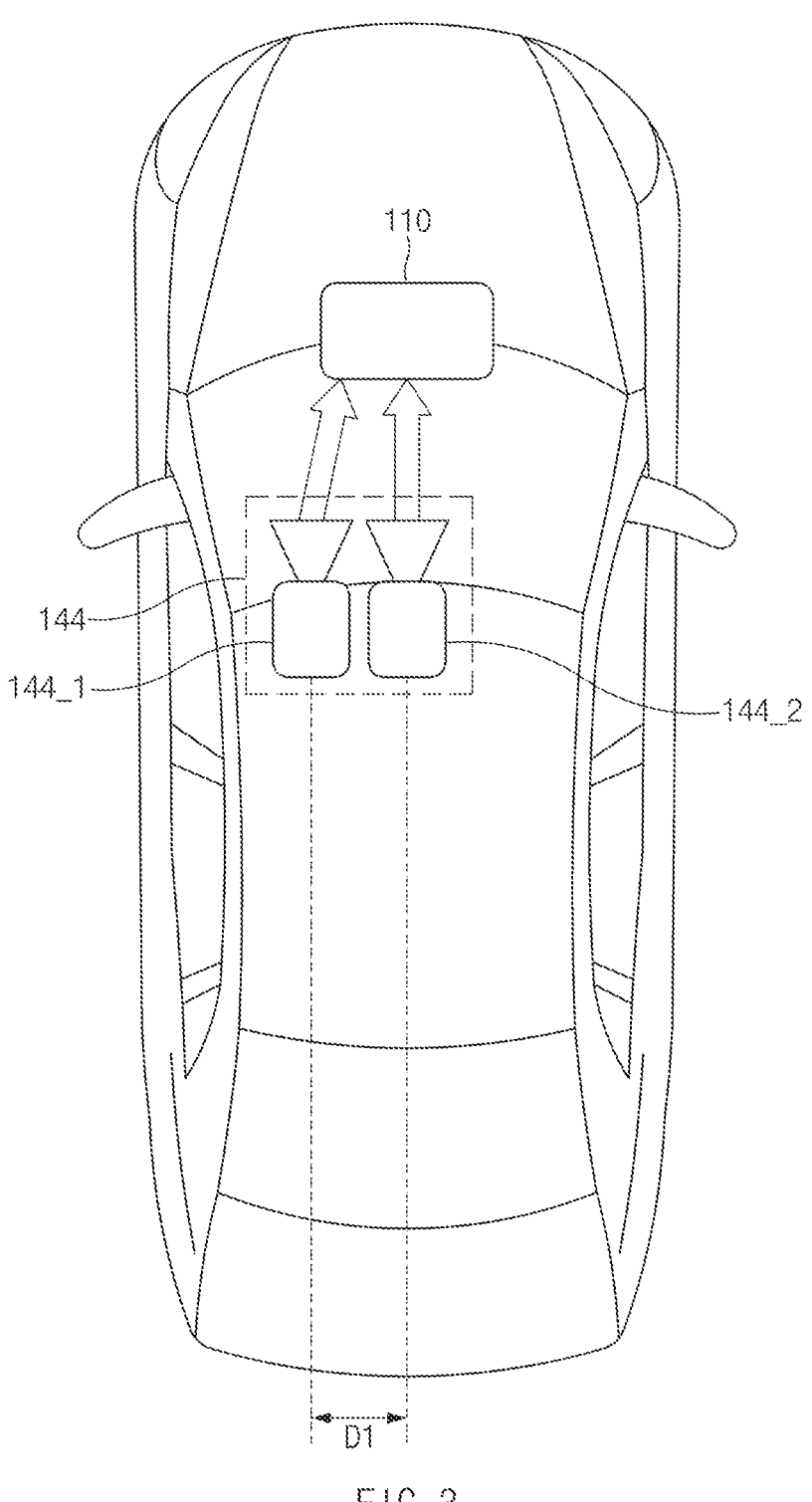
FIG. 3 is a view showing a position at which a camera of a vehicle control system according to one embodiment of the present disclosure is disposed on a vehicle.

FIG. 3 is a view showing a position in which a camera of the vehicle control system according to one embodiment of the present disclosure is disposed on the vehicle.

The camera 144 may include the first camera device 144_1 and the second camera device 144_2. The first camera device 144_1 and the second camera device 144_2 may be arranged side by side in the width direction of the vehicle. The first camera device 144_1 and the second camera device 144_2 may be arranged around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a first distance D1 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 4:
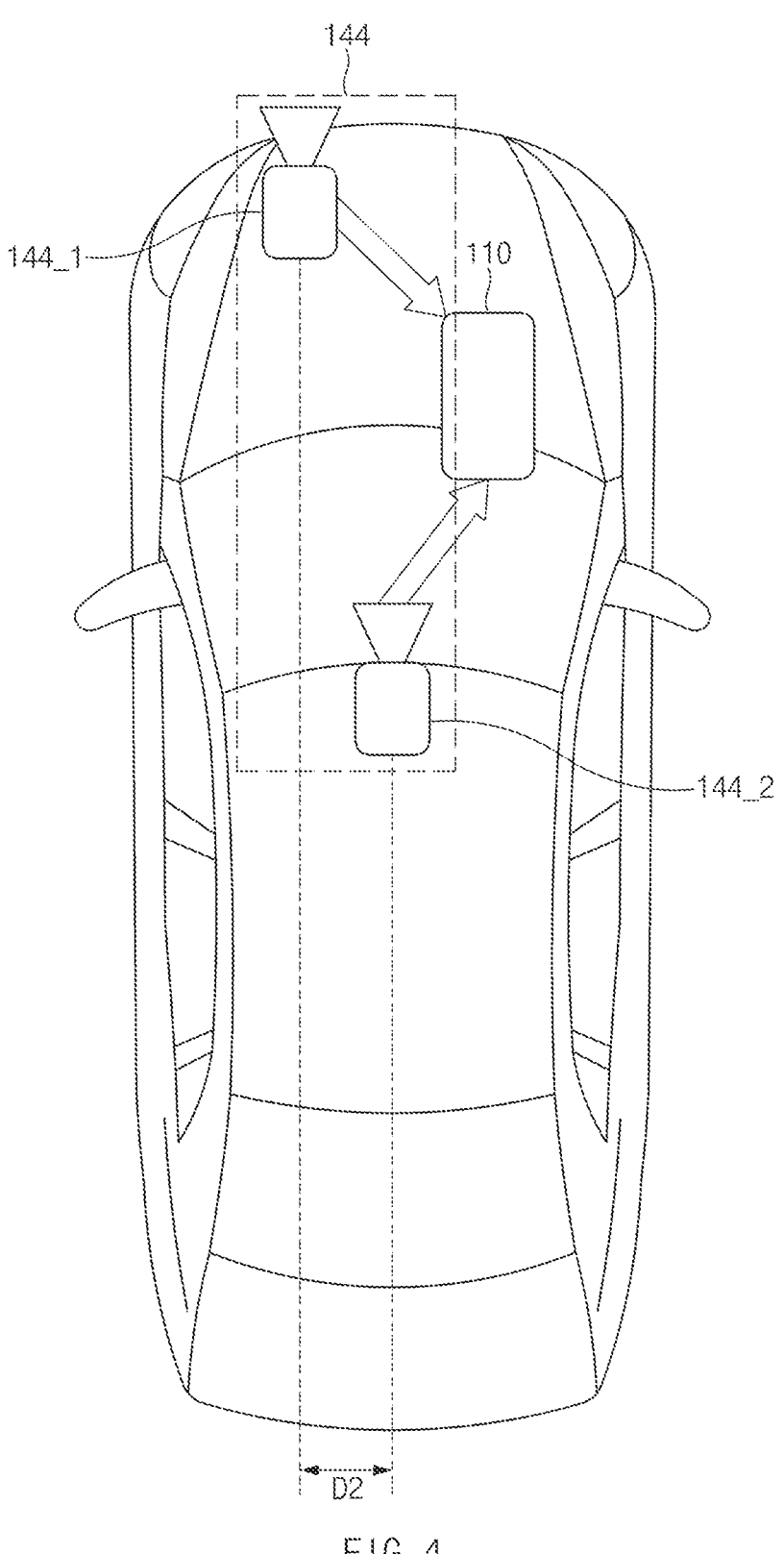
FIG. 4 is a view showing a position at which a camera of a vehicle control system according to one embodiment of the present disclosure is disposed on a vehicle.

FIG. 4 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 may be disposed above a bumper area of the vehicle or inside the bumper area. The first camera device 144_1 may be disposed adjacent to any one of corners of the bumper area. The second camera device 144_2 may be disposed around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a second distance D2 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 5:
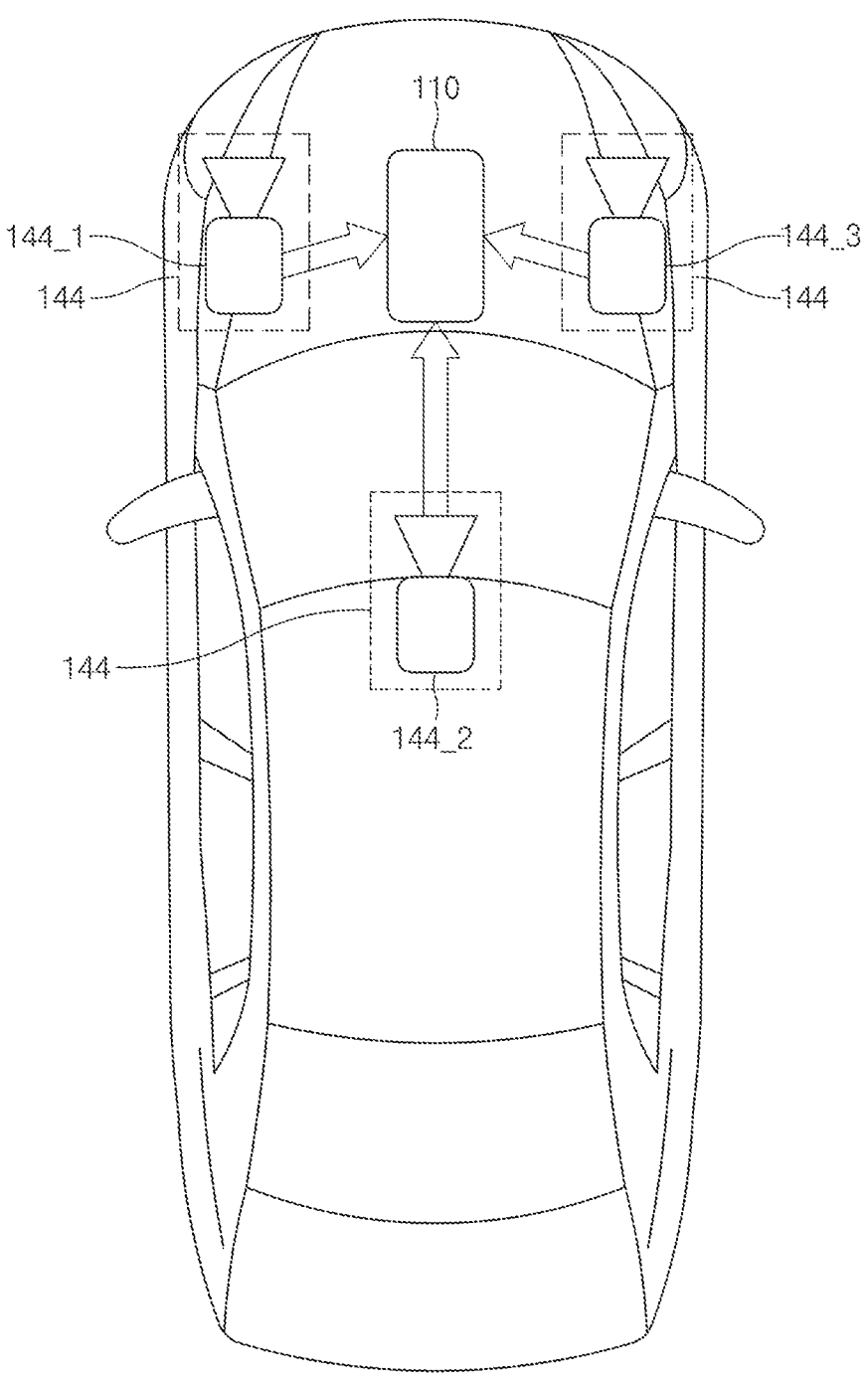
FIG. 5 is a view showing a position in which a camera of a vehicle control system according to one embodiment of the present disclosure is disposed on a vehicle.

FIG. 5 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 and the third camera device 144_3 may be disposed above or inside the bumper area of the vehicle. The first camera device 144_1 may be disposed adjacent to any one of the corners of the bumper area. The third camera device 144_3 may be disposed adjacent to a corner of the bumper area except for the corner where the first camera device 144_1 is disposed. The second camera device 144_2 may be disposed around the rear view mirror of the vehicle and/or adjacent to the driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) based on differences between positions of the first camera device 144_1, the second camera device 144_2, and the third camera device 144_3. The camera 144 may transmit the image data of the external environment as captured to the processor 110.

Figure 6:
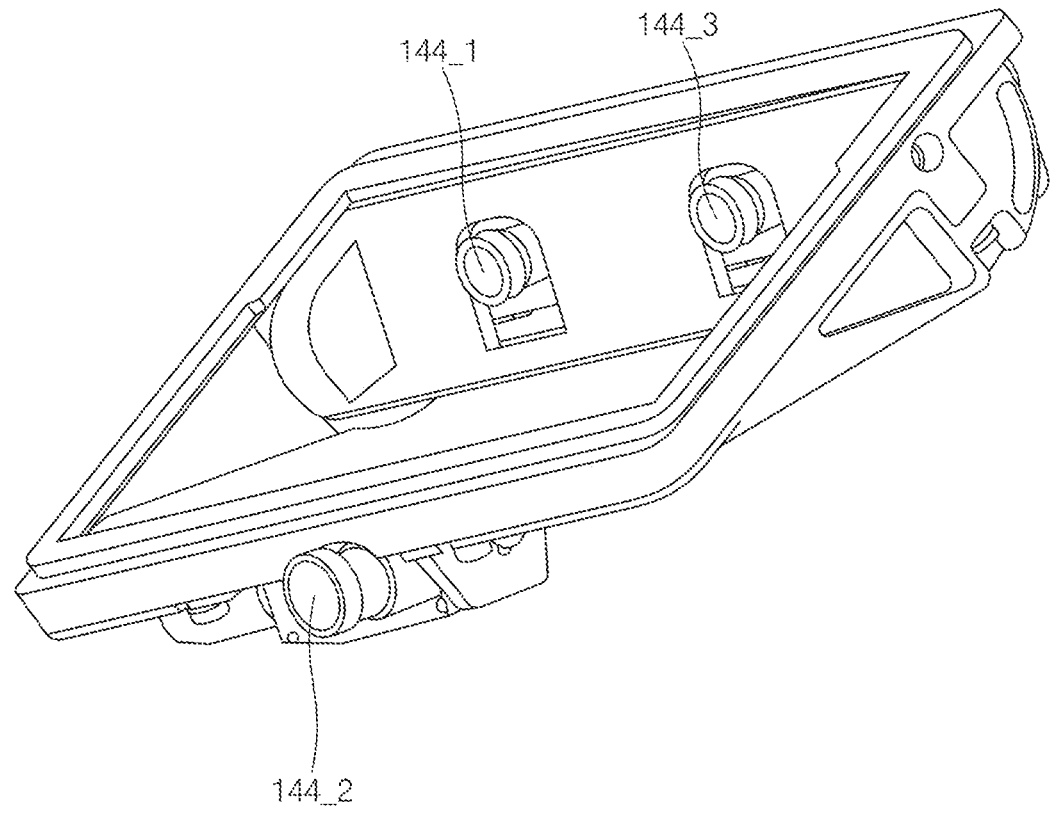
FIG. 6 is a view showing a plurality of camera devices of a vehicle control system according to one embodiment of the present disclosure.

FIG. 6 is a view showing a plurality of camera devices of the vehicle control system according to one embodiment of the present disclosure.

Figure 7:
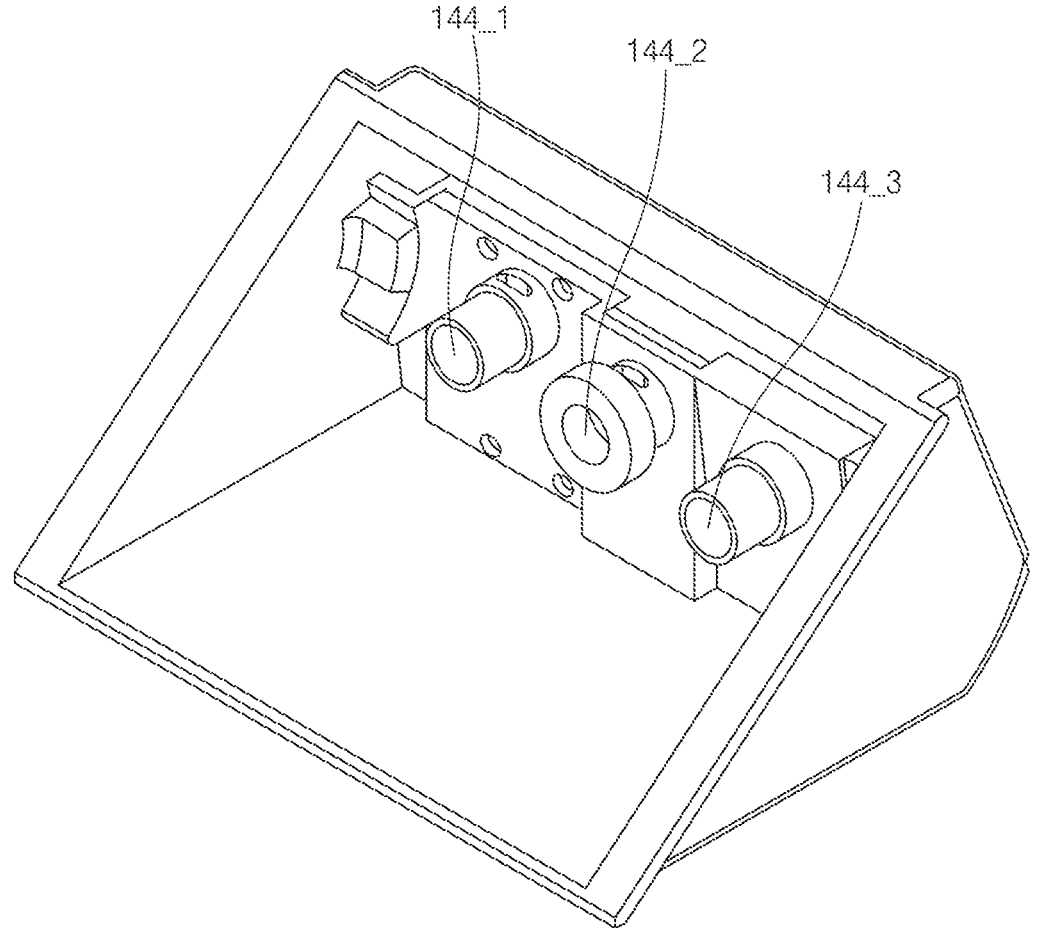
FIG. 7 is a view showing a plurality of camera devices of a vehicle control system according to one embodiment of the present disclosure.

The plurality of camera devices may include the first camera device 144_1, the second camera device 144_2, and the third camera device 144_3. FIG. 7 is a view showing a plurality of camera devices of a vehicle control system according to one embodiment of the present disclosure. The plurality of camera devices may include the first camera device 144_1, the second camera device 144_2, and the third camera device 144_3.

Each of the first camera device 144_1, the second camera device 144_2, and the third camera device 144_3 may include an image capture device of an appropriate type. The image capture device may include an optical axis. The image capture device may include an Aptina M9V024 WVGA sensor of a global shutter scheme. The image capture device may provide a resolution of 1280×960 pixels and may include a rolling shutter scheme. The image capture device may include a variety of optical elements. The image capture device may include at least one lens to provide a focal length and a field of view (FOV) required by the image capture device. The image capture device may be combined with a 6 mm lens or a 12 mm lens.

Each of the first camera device 144_1, the second camera device 144_2, and the third camera device 144_3 may have a designated field of view (FOV) angular range. Each of the first camera device 144_1, the second camera device 144_2, and the third camera device 144_3 may have a general field of view (FOV) angular range of 40 degrees or greater and 56 degrees or smaller. Each of the first camera device 144_1, the second camera device 144_2, and the third camera device 144_3 may have a narrow field of view (FOV) angular range of 23 degrees or greater and 40 degrees or smaller. Each of the first camera device 144_1, the second camera device 144_2, and the third camera device 144_3 may have a wide FOV (field of view) angular range of 100 degrees or greater and 180 degrees or smaller. Each of the first camera device 144_1, the second camera device 144_2, and the third camera device 144_3 may include a wide-angle bumper camera or a camera capable of securing up to a 180-degree field of view (FOV). The field of view (FOV) of the first camera device 144_1 may be wider, narrower, or partially overlapping than the field of view (FOV) of the second camera device 144_2.

A 7.2 megapixel image capture device with an aspect ratio of about 2:1 (e.g., H×V=3800×1900 pixels) and a horizontal field of view (FOV) of about 100 degrees may replace a configuration of a plurality of camera device composed of the first camera device 144_1, the second camera device 144_2, and the third camera device 144_3. A vertical field of view (FOV) of a megapixel image capture device using a radially symmetrical lens may be realized to be 50 degrees or smaller due to lens distortion. A radially asymmetric lens may be used to achieve a vertical field of view (FOV) of 50 degrees or greater for a horizontal field of view (FOV) of 100 degrees.

A driving support function may be provided using a multi-camera system including a plurality of camera devices. The multi-camera system may use at least one camera facing in a front direction of the vehicle. In the multi-camera system, at least one camera may face in a side direction or a rear direction of the vehicle. The multi-camera system may be configured so that the first camera device 144_1 and the second camera device 144_2 face in the front direction and/or the side direction of the vehicle using a dual-camera imaging system.

The multi-camera systems including the plurality of camera devices may employ a triple camera imaging system in which FOVs (field of view) of the first camera device 144_1, the second camera device 144_2, and the third camera device 144_3 are different from each other. The triple-camera imaging system may perform determinations based on information obtained from objects positioned at various distances in the front and side directions of the vehicle.

The first camera device 144_1 may be connected to a first image processor to perform monocular image analysis of an image provided by the first camera device 144_1. The second camera device 144_2 may be connected to a second image processor to perform monocular image analysis of an image provided by the second camera device 144_2. Information processed and output by the first and the second image processors may be combined with each other. The second image processor may receive images from both the first camera device 144_1 and the second camera device 144_2 and perform three-dimensional analysis thereon. Monocular image analysis may mean image analysis performed based on an image captured from a single field of view (e.g., an image captured by a single camera). The three-dimensional image analysis may mean image analysis performed based on two or more images captured with at least one image capture parameter (e.g., images captured respectively by at least two cameras). Captured images suitable for three-dimensional image analysis may include images captured from at least two positions, images captured from different fields of views (FOV), images captured using different focal lengths, and images captured based on parallax information.

Figure 8:
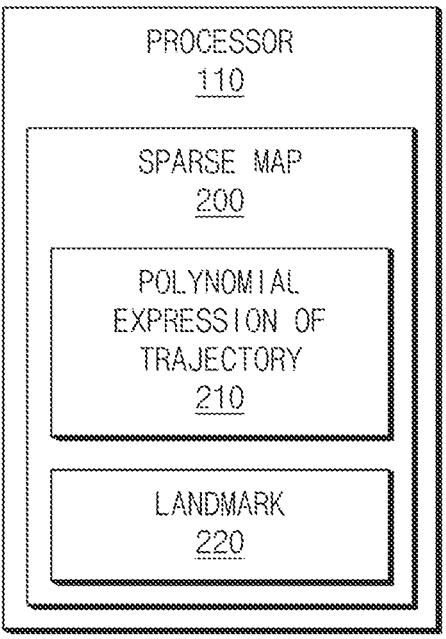
FIG. 8 is a block diagram showing a sparse map of a processor according to one embodiment of the present disclosure.

FIG. 8 is a block diagram showing a sparse map of a processor according to one embodiment of the present disclosure.

The processor 110 may include a sparse map 200. The sparse map 200 may be used for autonomous driving. The sparse map 200 may provide information for navigation of autonomous driving vehicles. The sparse map 200 and the data processed by the sparse map 200 may be stored in a memory of the vehicle control system or may be transmitted/ received to/from a remote server. The sparse map 200 may store therein and use a polynomial expression of at least one trajectory along which the vehicle travels on a road. In the sparse map 200, a feature of a road section may be simplified and may be recognized as an object. The sparse map 200 may reduce an amount of data stored and transmitted/ received for autonomous driving vehicle navigation. The sparse map 200 may include a polynomial expression 210 of a trajectory and a landmark 220.

The polynomial expression 210 of the trajectory may be a polynomial expression of a target trajectory for guiding autonomous driving along a road section. The target trajectory may represent an ideal route for a vehicle to travel in a road section. The road section may be expressed with at least one target trajectory. The number of target trajectories may be smaller than the number of a plurality of lines included in the road section. A vehicle operating on a road may determine navigation in consideration of a line corresponding to the target trajectory and a line offset using one of the target trajectories.

The landmark 220 may be a place or a mark associated with a specific road section or a local map. The landmark 220 may be identified and stored in the sparse map 200. A spacing between landmarks 220 may be adjusted. The landmark 220 may be used for autonomous driving navigation. The landmark 220 may be used to determine the vehicle's current position with respect to the stored target trajectory. An autonomous driving vehicle may adjust a travel direction at a current position so as to coincide with a direction of the target trajectory using the vehicle's current position information.

The landmark 220 may be used as a reference point for determining a position of the vehicle with respect to the target trajectory. While the vehicle drives based on dead reckoning in which the vehicle determine its itself-movement and estimates its position with respect to the target trajectory, the vehicle may eliminate an error in a position determination due to the dead reckoning, using a position of the landmark 220 that appears in the sparse map 200. The landmark 220 identified in the sparse map 200 may act as an anchor to allow the vehicle to accurately determine the vehicle's position with respect to the target trajectory.

Figure 9:
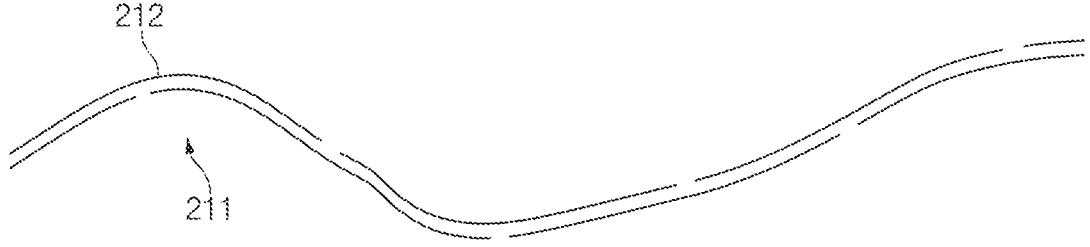
FIG. 9 is a diagram showing a polynomial expression of a trajectory according to one embodiment of the present disclosure.

FIG. 9 is a diagram showing the polynomial expression of the trajectory according to one embodiment of the present disclosure.

The sparse map may include information about a feature of a road. The sparse map may store therein a curved shape in sections 212 included in a road 211. Each of the sections 212 may have a curved shape that may be expressed as a polynomial. The road 211 may be modeled as a three-dimensional polynomial expression as a combination of the curved shapes of the lines, each line including left and right sides. A plurality of polynomials may be used to express a position and a shape of the road 211 and each of the sections 212 included in the road 211. A polynomial expressing each of the sections 212 may define a position and a shape of the section 212 within a specified distance.

Figure 10:
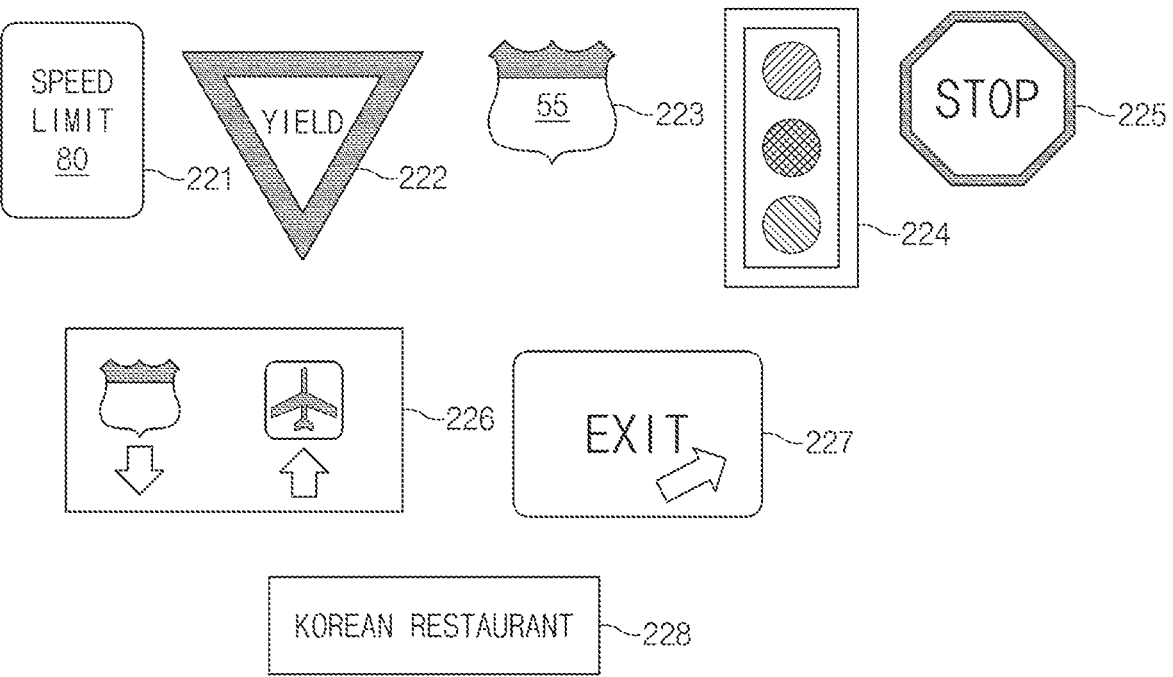
FIG. 10 is a diagram showing a landmark according to one embodiment of the present disclosure.

FIG. 10 is a diagram showing a landmark according to one embodiment of the present disclosure.

The landmarks may include a traffic sign plate, a direction indication sign plate, roadside facilities, and a general sign plate. The traffic sign plate may be a sign plate that guides traffic conditions and regulations to be observed during driving. The traffic sign plate may include a speed limit sign plate 221, a yield sign plate 222, a road number sign plate 223, a traffic signal sign plate 224, and a stop sign plate 225. The direction indication sign plate may be a sign plate with at least one arrow indicating at least one direction to another location. The direction indication sign plate may include a highway sign plate 226 with an arrow guiding the vehicle to another road or location and an exit sign plate 227 with an arrow guiding the vehicle out of the road. The general sign plate may be a sign plate that provides information related to a place. The general sign plate may include a signboard 228 of a famous restaurant in an area.

The sparse map may include a plurality of landmarks related to the road section. A simplified image of an actual image of each landmark may be stored in the sparse map. The simplified image may be composed of data depicting a feature of the landmark. The image stored in the sparse map may be expressed and recognized using a smaller amount of data than an amount of data required by the actual image. Data representing the landmark may include information to depicting or identify the landmark formed along the road.

Figure 11:
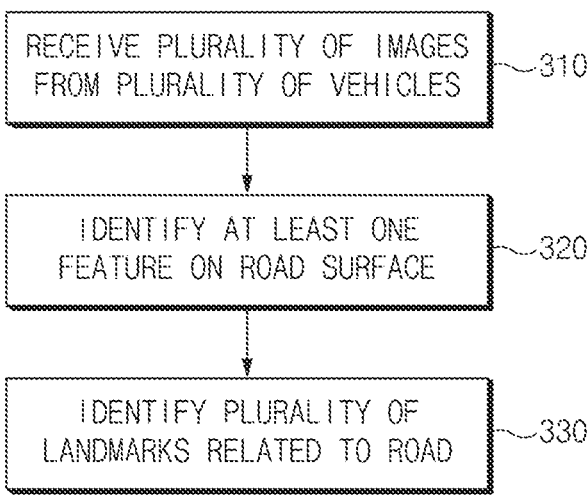
FIG. 11 is a flowchart showing a method in which a vehicle control system according to one embodiment of the present disclosure generates a sparse map.

FIG. 11 is a flowchart showing a method of generating a sparse map according to one embodiment of the present disclosure.

The vehicle control system may receive a plurality of images from a plurality of vehicles in operation 310. Each of the plurality of cameras disposed on the vehicle may image a vehicle surrounding situation which the vehicle faces while driving along the road section and thus may capture a plurality of images showing the vehicle surrounding situation. The plurality of images showing the vehicle surrounding situation may show a shape and a situation of the vehicle's travel route. The vehicle control system may receive the plurality of images captured by the plurality of cameras.

The vehicle control system may identify at least one feature on a road surface in operation 320. The vehicle control system may simplify a feature of the road surface running along the road section as a representation of at least one line, based on the plurality of images. The simplified line representation of the feature of the road surface may represent a route along the road section substantially corresponding to the road surface feature. The vehicle control system may analyze the plurality of images received from the plurality of cameras to identify an edge or a lane mark of a road. The vehicle control system may determine a driving trajectory following a road section associated with the edge of the road or the lane mark thereof. A trajectory or line representation may include a spline, a polynomial expression, or a curve. The vehicle control system may determine the vehicle's driving trajectory based on the camera's itself-movement, such as 3D translation and/or 3D rotational movement.

The vehicle control system may identify a plurality of landmarks related to the road in operation 330. The vehicle control system may analyze the plurality of images received from the camera to identify at least one landmark on the road section. The landmarks may include the traffic sign plate, the direction indication sign plate, the roadside facilities, and the general sign plate. The analysis may include a rule for admitting and rejecting a determination that the landmark may be a landmark related to a road section. The analysis may include a rule in which when a ratio of images in which the landmark appears to images in which no landmark appears exceeds a threshold value, the determination that the landmark may be a landmark related to a road section is admitted, and a rule in which when a ratio of images in which no landmark appears to images in which the landmark appears exceeds a threshold value, the determination that the landmark may be a landmark related to a road section is rejected.

Figure 12:
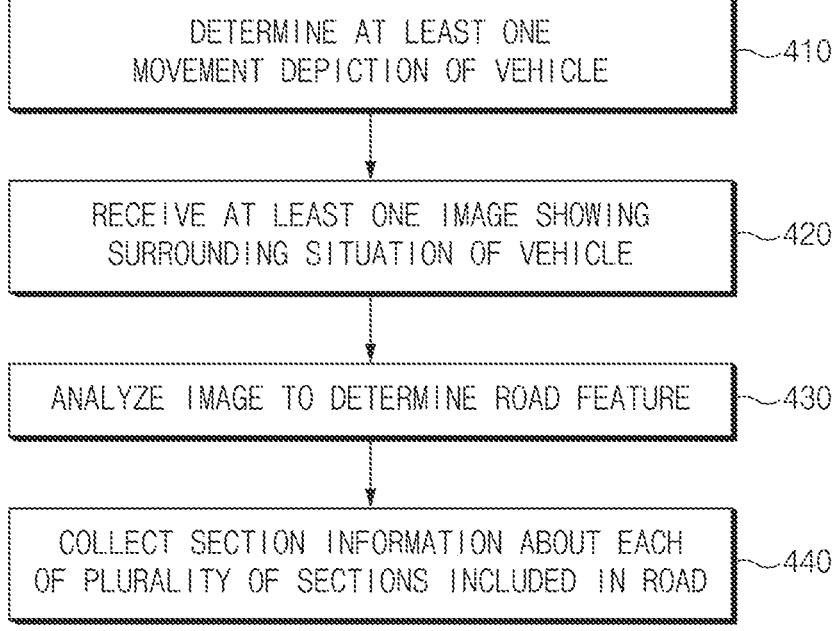
FIG. 12 is a flowchart showing a method for anonymizing navigation information by a vehicle control system according to one embodiment of the present disclosure.

FIG. 12 is a flowchart showing a method in which the vehicle control system according to one embodiment of the present disclosure anonymize navigation information.

The vehicle control system may determine at least one movement depiction of the vehicle in operation 410. The vehicle control system may determine at least one movement depiction based on an output value of the sensor. At least one movement description may include any indicator of the vehicle's movement. For example, at least one movement depiction may include an acceleration of the vehicle, a speed of the vehicle, longitudinal and transversal positions of the vehicle at a specific time, a three-dimensional position of the vehicle, and a determined trajectory of the vehicle.

At least one movement depiction may include the vehicle's itself-movement depiction in a predetermined coordinate system. The itself-movement may include rotation, translation, or movement in a transverse direction, longitudinal direction, or other directions of the vehicle. The vehicle's itself-movement may be expressed using a speed, a yaw rate, a tilt or a roll of the vehicle. A self-movement depiction of the vehicle may be determined on a given level of freedom.

The vehicle control system may receive at least one image showing the surrounding situation of the vehicle in operation 420. The vehicle control system may receive, from the camera, an image of the road on which the vehicle is driving and an image of a surrounding around the vehicle.

The vehicle control system may analyze the image to determine a road feature in operation 430. The vehicle control system may analyze at least one image according to a command stored in the image analysis module, or utilize a learning system such as a neural network to determine at least one road feature. At least one road feature may include a road feature such as a median line of the road, an edge of the road, a landmark along the road, a pothole on the road, a turn of the road, or the like. At least one road feature may include a lane feature including an indicator indicating at least one of lane separation, lane merging, dashed-line lane indication, solid-line lane indication, a road surface color in a lane, a line color, a lane direction, or a lane type regarding a lane as detected. The lane feature may include a determination that the lane is a HOV (High-Occupancy Vehicles) lane and a determination that the lane is separated from another lane by a solid line. At least one road feature may include an indicator of a road edge. The road edge may be determined based on a detected barrier along the road edge, a detected sidewalk, a line indicating an edge, a road boundary stone along the road edge, or based on detection of an object along the road.

The vehicle control system may collect section information about each of a plurality of sections included in the road in operation 440. The vehicle control system may divide the road into the plurality of sections. The vehicle control system may combine each of the plurality of sections with the road feature to collect the section information about each of the plurality of sections. The section information may include at least one movement depiction of the vehicle and/or at least one road feature relative to the section of the road. The vehicle control system may collect the section information including the movement depiction calculated in operation 410 and the road feature determined in operation 430.

Figure 13:
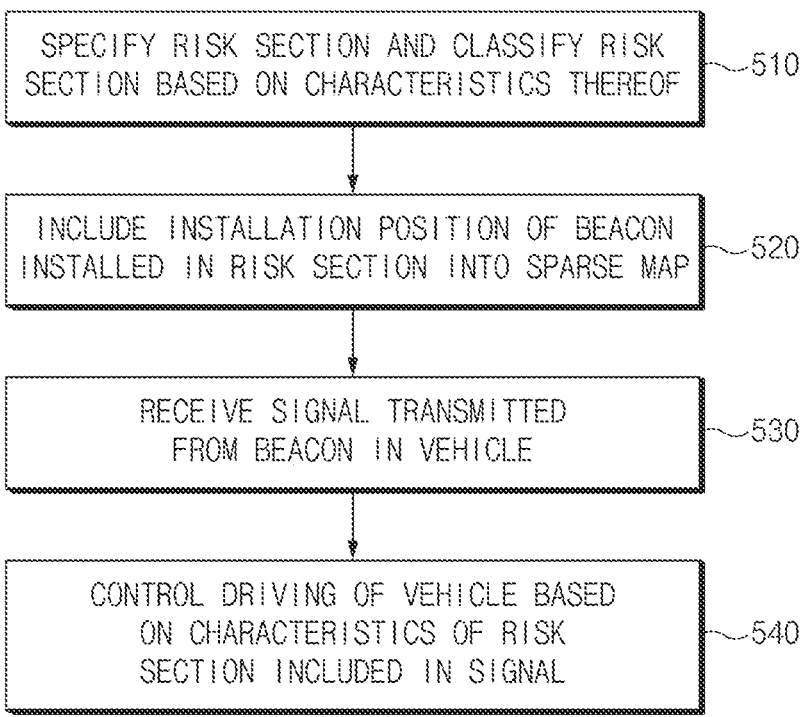
FIG. 13 is a flowchart showing a method in which a vehicle control system according to one embodiment of the present disclosure includes a beacon of a risk section in a sparse map to control driving of a vehicle.

FIG. 13 is a flowchart showing a method in which the vehicle control system according to one embodiment of the present disclosure includes a beacon of a risk section into a sparse map to control driving of a vehicle.

The vehicle control system may specify a risk section and classify a risk section based on characteristics thereof in operation 510. The risk section may include an accident-prone section, an intersection section, and a long-term construction section. The risk section may include a high risk section that requires driving mode adjustment and a low/medium risk section that requires visual and/or audible notification to the driver through a warning mode. The accident-prone section may be a high risk section. The intersection section and the long-term construction section may be low/medium risk sections. The vehicle control system may specify a section defined as a risk section such as an accident frequent section, an intersection section, and a long-term construction section in a route, and may classify the specified risk section into a high risk section and a low/medium risk section based on the characteristics thereof.

In operation 520, the vehicle control system may include an installation position of a beacon installed in the risk section into the sparse map. The beacon may be a structure and/or an electronic device for indicating a risk section. The installation position of the beacon may be defined using latitude and longitude values. The vehicle control system may include the latitude and longitude values of each of the beacons installed in the risk section into the sparse map.

The vehicle control system of the vehicle may receive a signal transmitted from the beacon in operation 530. The beacon may transmit the signal including position information and information about the risk section. The signal transmitted from the beacon may be a low energy Bluetooth signal. The vehicle control system of the vehicle may receive the low-energy Bluetooth signal transmitted from the beacon using the vehicle's Bluetooth function.

The vehicle control system may control the driving of the vehicle based on the characteristics of the risk section included in the signal in operation 540. The vehicle control system may determine whether the vehicle is approaching the risk section based on the position information including the latitude value and the longitude value of the beacon received by the vehicle and the information about the risk section included in the signal transmitted from the beacon. When the vehicle is approaching the risk section, the vehicle control system may provide a notification to the driver and control the vehicle's driving mode, based on the characteristics of the risk section.

The vehicle control system may reduce a control speed in a longitudinal direction to a certain speed or smaller when the vehicle is approaching or arriving at the high risk section. The vehicle control system may output a reason for the control speed deceleration through the cluster. The vehicle control system may provide the driver with guidance on driving mode change. For example, the vehicle control system may output "We are going to enter an accident-prone section after a while. A vehicle will be driven at a driving speed of 70 km/h or lower." through the cluster.

When the vehicle is approaching or arriving at a low/medium risk section, the vehicle control system may provide a visual or audible notification according to the characteristics of the risk section. The vehicle control system may provide the driver with guidance on the low and medium risk section. For example, the vehicle control system may output "We are going to enter the intersection section in a moment." through the cluster. In another example, the vehicle control system may output "We enters a risk section. The vehicle control system may repeatedly provide the guidance.

Figure 14:
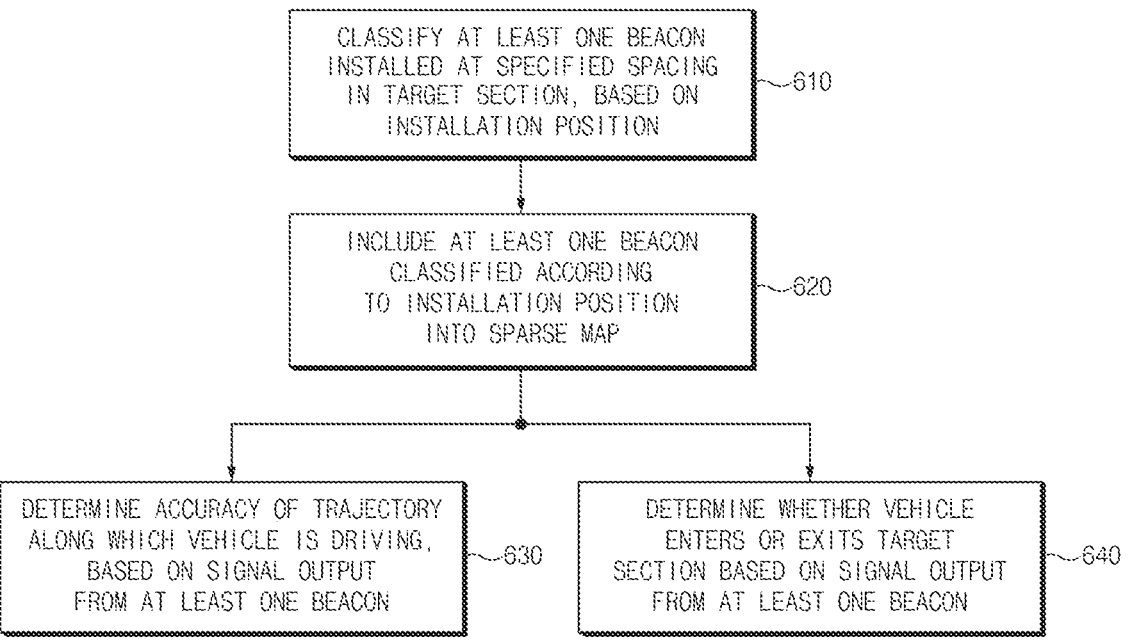
FIG. 14 is a flowchart showing a method in which a vehicle control system according to one embodiment of the present disclosure controls driving and a function of a vehicle using a beacon in an area where a navigation satellite signal is not received.

FIG. 14 is a flowchart showing a method in which a vehicle control system according to one embodiment of the present disclosure controls driving and a function of a vehicle using a beacon in an area where a navigation satellite signal is not received. The navigation satellite signal may be a signal supported by the GNSS (Global Navigation satellite System). When receiving the navigation satellite signal, the vehicle control system may identify whether the vehicle's current position and travel route are correct. The area where the navigation satellite signal is not received may be a closed space where the navigation satellite signal cannot reach, such as a tunnel or an underpass.

In a target section, at least one beacon may be installed at a specified spacing. The target section may be a section included in the area where the navigation satellite signal is not received. The target section may be a tunnel section or an underpass section. The beacon may be installed in the target section such as the tunnels or the underpass. When the vehicle drives along the target section, at least one beacon may be installed at a specified spacing so that a signal transmitted from the beacon may be detected at a specified intensity or higher.

The vehicle control system may classify the at least one beacon installed at a specified spacing in the target section, based on the installation position in operation 610. The vehicle control system may classify the at least one beacon into a tunnel beacon and an underpass beacon. The vehicle control system may classify the tunnel beacon into a tunnel entrance beacon, a tunnel exit beacon, and a tunnel internal beacon. The vehicle control system may classify the underpass beacon into an underpass entrance beacon, an underpass exit beacon, and an underpass internal beacon. The vehicle control system may label a type of each of at least one beacon.

The vehicle control system may include at least one beacon classified according to the installation position into the sparse map in operation 620. The vehicle control system may include each of at least one beacon whose the type is labelled in the sparse map. The vehicle control system may measure a longitude and a latitude of the installation position of each of the at least one beacon. The vehicle control system may include information about the longitude and the latitude of the installation position of each of the at least one beacon into the sparse map.

The vehicle control system may determine accuracy of the trajectory along which the vehicle is driving, based on a signal output from at least one beacon in operation 630. The signal output from at least one beacon may be a Bluetooth communication signal. The vehicle control system may receive a signal of the tunnel entrance beacon and identify a longitude and a latitude of the installation position of the tunnel entrance beacon based on the signal. The vehicle control system may identify the signal of the tunnel exit beacon and exit a tunnel entry mode.

The vehicle control system may compare the Bluetooth strengths of the beacons representing the lanes with each other during autonomous driving navigation driving and determine the accuracy of the trajectory along which the vehicle is driving, based on the comparing result, and determine whether the trajectory is to be used for trajectory update of the sparse map. The tunnel internal beacons may be classified based on lanes. Frequencies and/or waveforms of the signal transmitted from the beacons of different lines may be different from each other. The vehicle control system may correct driving accuracy using intensities of the beacons classified based on the lanes. The signals transmitted from the beacons may be measured for a specified time and may be grouped. When the signals transmitted from the beacons are grouped, accuracy of the strength of the measured signal may be improved.

When the vehicle drives along a second lane on a two-lane road, the vehicle control system may identify whether a strength of a signal transmitted from a beacon installed on the second lane is greater than a strength of a signal transmitted from a beacon installed on a first lane. When the strength of the signal transmitted from the beacon installed on the second lane is greater than the strength of the signal transmitted from the beacon installed on the first lane, the vehicle control system may maintain the current driving mode. When maintaining the current driving mode, the vehicle control system may use the trajectory along which the vehicle is driving to update the trajectory of the sparse map.

When the vehicle drives along a second lane on a two-lane road, the vehicle control system may identify whether the strength of the signal transmitted from the beacon installed on the second lane is greater than the strength of the signal transmitted from the beacon installed on the first lane for a certain time duration or greater. When the strength of the signal transmitted from the beacon installed on the first lane is greater than the strength of the signal transmitted from the beacon installed on the second lane for the certain time duration or greater, the vehicle control system may exclude the current trajectory of a tunnel or an underpass along which the vehicle is driving from the trajectory update of the sparse map.

The vehicle control system may determine whether the vehicle enters or exits the target section based on a signal output from at least one beacon in operation 640. The vehicle control system may control a convenience function of the vehicle based on whether the vehicle enters or exits the target section. The vehicle control system may change to the tunnel entry mode when receiving a signal from the tunnel entrance beacon. The vehicle control system may issue a notification and/or warning to the vehicle's driver indicating that the vehicle has currently entered the tunnel. The vehicle control system may indicate that the vehicle has currently entered the tunnel through the vehicle's cluster. The vehicle control system may change to a tunnel driving mode upon receiving a signal from the tunnel internal beacon. The vehicle control system may automatically close the vehicle's windows in the tunnel driving mode. The vehicle control system may implement the vehicle's air cleaning function in the tunnel driving mode. The vehicle control system may automatically turn on front headlights of the vehicle in the tunnel driving mode. The vehicle control system may identify a signal of the tunnel exit beacon and exit the tunnel entry mode.

The vehicle control system according to the present disclosure may improve accuracy of a travel route on which the vehicle is to drive.

In addition, various effects directly or indirectly identified via the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control system comprising:
a processor configured to process data related to driving of a vehicle; and a vehicle controller configured to control the driving of the vehicle, wherein the processor is configured to:

receive a plurality of images captured by cameras of a plurality of vehicles while the plurality of vehicles travels along a road, identify road surface features associated with the road from the plurality of images, simplify line representations of the road surface features, identify a plurality of sections of a road based on the simplified line representations, generate a sparse map representing the plurality of sections, identify a risk section among the plurality of sections based on section information of each of the plurality of sections, the section information including at least one movement depiction of the vehicle and at least one road feature, analyze characteristics of the risk section of the road corresponding to a low-energy Bluetooth signal received from a communication with a beacon installed in the risk section of the road and classify the risk section into a high risk section and a low/medium risk section, based on the sparse map including an installation position of the beacon, and characteristic information of the risk section, wherein the high risk section includes an accident-prone section and the low/medium risk section includes an intersection section and a long term construction section, when the vehicle is approaching or arriving at the high risk section of the risk section, the processor is configured to control the vehicle controller to reduce a speed in a longitudinal direction of the vehicle to a predefined speed or lower, the processor is further configured to identify a target section corresponding to an area where a satellite signal is not received among the plurality of sections, based on the identification of the target section, the processor is further configured to control at least one operation of the vehicle, at least one operation including tunnel driving, window control operation and air cleaning function control.

2. The system of claim 1, wherein the vehicle controller is configured to control the driving of the vehicle based on the characteristics of the risk section.

3. The system of claim 1, wherein the risk section includes:
the high risk section requiring driving mode adjustment; and
the low/medium risk section requiring visual and/or audible notification to a driver via a warning mode.

4. The system of claim 1, wherein the processor is configured to include a latitude value and a longitude value of the beacon installed in the risk section into the sparse map.

5. The system of claim 1, wherein the processor is configured to determine whether the vehicle is approaching the risk section, based on a position information including a latitude value and a longitude value of the beacon received by the vehicle and information about the risk section included in the signal transmitted from the beacon.

6. The system of claim 1, wherein when the vehicle is approaching the risk section, the processor is configured to provide a notification to a driver, based on the characteristics of the risk section.

7. A method for driving a vehicle using a vehicle control system, the method comprising:

receiving a plurality of images captured by cameras of a plurality of vehicles while the plurality of vehicles travels along a road, identifying road surface features associated with the road from the plurality of images, simplifying line representations of the road surface features, identifying a plurality of sections of a road based on the simplified line representations, generating a sparse map representing the plurality of sections, identifying a risk section among the plurality of sections based on section information of each of the plurality of sections, the section information including at least one movement depiction of the vehicle and at least one road feature, analyzing characteristics of the risk section of the road corresponding to a low-energy Bluetooth signal received from a communication with a beacon installed in the risk section of the road and classifying the risk section into a high risk section and a low/medium risk section, based on the sparse map including an installation position of the beacon, and characteristic information of the risk section, wherein the high risk section includes an accident-prone section and the low/medium risk section includes an intersection section and a long term construction section; and when the vehicle is approaching or arriving at the high risk section of the risk section, reducing a speed in a longitudinal direction of the vehicle to a predefined speed or lower, the method further comprising identifying a target section corresponding to an area where a satellite signal is not received among the plurality of sections, based on the identification of the target section, and controlling at least one operation of the vehicle, at least one operation including tunnel driving, window control operation and air cleaning function control.

8. The method of claim 7, wherein the risk section includes:

the high risk section requiring driving mode adjustment; and the low/medium risk section requiring visual and/or audible notification to a driver via a warning mode.

9. The method of claim 7, wherein the method further comprises generating the sparse map to include the installation position of the beacon, wherein generating the sparse map includes: inserting a latitude value and a longitude value of the beacon installed in the risk section into the sparse map.

* * * * *